(12) United States Patent
Morikawa et al.

(10) Patent No.: US 6,946,222 B2
(45) Date of Patent: Sep. 20, 2005

(54) SINTERED NICKEL ELECTRODE FOR ALKALINE STORAGE BATTERY, METHOD OF FORMING THE SAME, AND ALKALINE STORAGE BATTERY

(75) Inventors: Yuki Morikawa, Tokushima (JP); Takeshi Ogasawara, Hirakata (JP); Mitsunori Tokuda, Tokushima (JP); Mutsumi Yano, Hirakata (JP); Shin Fujitani, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 291 days.

(21) Appl. No.: 10/061,358

(22) Filed: Feb. 4, 2002

(65) Prior Publication Data

US 2002/0164526 A1 Nov. 7, 2002

(30) Foreign Application Priority Data

Feb. 5, 2001 (JP) ........................................ 2001-027983

(51) Int. Cl.⁷ ............................. H01M 4/32; H01M 4/52
(52) U.S. Cl. .................... 429/223; 429/232; 429/218.1; 429/231.5; 429/235; 429/126.1
(58) Field of Search ................................. 429/223, 232, 429/218.1, 231.5, 235; 427/126.1

(56) References Cited

U.S. PATENT DOCUMENTS

| 4,402,815 A | * | 9/1983 | Brown et al. ............ 204/290.13 |
| 6,040,087 A | * | 3/2000 | Kawakami ................ 429/218.1 |
| 6,399,247 B1 | * | 6/2002 | Kitayama et al. ............ 429/223 |

FOREIGN PATENT DOCUMENTS

| EP | 1 032 067 A | 8/2000 |
| JP | 07-045282 | 2/1995 |
| JP | 08-222213 | 8/1996 |
| JP | 11-238511 | 8/1999 |

* cited by examiner

Primary Examiner—Patrick Joseph Ryan
Assistant Examiner—Angela J. Martin
(74) Attorney, Agent, or Firm—Westerman, Hattori, Daniels & Adrian, LLP

(57) ABSTRACT

In a sintered nickel electrode for alkaline storage battery formed by filling nickel hydroxide as an active material into a porous sintered substrate and an alkaline storage battery using as its positive electrode the sintered nickel electrode for alkaline storage battery, tungstic acid is adhered to a surface of said nickel hydroxide as an active material.

3 Claims, 1 Drawing Sheet

SINTERED NICKEL ELECTRODE FOR ALKALINE STORAGE BATTERY, METHOD OF FORMING THE SAME, AND ALKALINE STORAGE BATTERY

BACKGROUND OF THE INVENTION

1. Field of the Invention

The present invention relates generally to a sintered nickel electrode for alkaline storage battery formed by filling nickel hydroxide as an active material into a porous sintered substrate, method of forming the same, and an alkaline storage battery using as its positive electrode such sintered nickel electrode for alkaline storage battery, and is particularly characterized in that the above-mentioned sintered nickel electrode for alkaline storage battery is modified to improve charge characteristic under high temperature conditions, thus to stably attain a high discharge capacity in the alkaline storage battery using as its positive electrode such sintered nickel electrode for alkaline storage battery.

2. Description of the Related Art

In alkaline storage batteries including a nickel-metal hydride battery, nickel-cadmium battery, and the like, a sintered nickel electrode for alkaline storage battery has been used as its positive electrode.

The sintered nickel electrode for alkaline storage battery has been formed by chemically impregnating a porous sintered substrate which is obtained by sintering with salt as an active material, and then filling nickel hydroxide as the active material into the sintered substrate. Such nickel electrode for alkaline storage battery is superior in charge/discharge characteristic at high electric current because conductivity of the sintered substrate is high and close adherence between the active material and the sintered substrate is high.

However, there have remained problems that when the alkaline storage battery using as its positive electrode the above-mentioned sintered nickel electrode for alkaline storage battery is charged under high temperature conditions, an oxygen evolution overvoltage of the positive electrode is decreased, thus in addition to a charge reactivity in which the nickel hydroxide is oxidized to nickel oxyhydroxide, an oxygen evolution reaction as a side reaction occurs, thus a sufficient discharge capacity is not attained, and hence charge characteristic under high temperature conditions is degraded.

SUMMARY OF THE INVENTION

An object of the present invention is to modify characteristic of a sintered nickel electrode for alkaline storage battery formed by filling nickel hydroxide as an active material into a porous sintered substrate.

Another object of the present invention is to prevent an oxygen evolution overvoltage of a positive electrode from decreasing, thus to restrain oxygen from evoluting in the positive electrode during charge, and hence to stably attain a sufficient discharge capacity under high temperature conditions, even in a case in which an alkaline storage battery using as its positive electrode the above-mentioned sintered nickel electrode for alkaline storage battery is charged under high temperature conditions.

The sintered nickel electrode for alkaline storage battery according to the present invention is formed by filling nickel hydroxide as the active material into the porous sintered substrate, wherein tungstic acid is adhered to a surface of said nickel hydroxide.

As the above-mentioned sintered nickel electrode for alkaline storage battery, when the tungstic acid is adhered to the surface of the nickel hydroxide filled into the porous sintered substrate, the oxygen evolution overvoltage of the positive electrode is increased for the effect of the above-mentioned tungstic acid. Thus, when the alkaline storage battery using as its positive electrode the sintered nickel electrode for alkaline storage battery is charged under high temperature conditions, an oxygen evolution reaction as a side reaction is prevented from occurring, thus charge characteristic of the alkaline storage battery under high temperature conditions is improved, and hence the sufficient discharge capacity is stably attained.

In adhering the tungstic acid to the surface of the nickel hydroxide as the active material, when an amount of the tungstic acid based on the nickel hydroxide is too small, the oxygen evolution overvoltage of the sintered nickel electrode is not sufficiently increased, thus the charge characteristic of the alkaline storage battery is not sufficiently improved under high temperature conditions. On the other hand, when the amount of the tungstic acid is too large, current collectivity of the sintered nickel electrode is degraded for the effect of too much amount of the tungstic acid, thus utilization efficiency of the active material is decreased. Therefore, a ratio of tungsten element in the tungstic acid based on the nickel hydroxide is preferably set in a range of 0.05 to 3 wt %. As the above-mentioned tungstic acid, a hydrate of tungstic trioxide represented by a compositional formula $WO_3.nH_2O$ can be used.

The above-mentioned sintered nickel electrode for alkaline storage battery is formed by chemically filling the nickel hydroxide as the active material into the pore of the porous sintered substrate, then immersing the sintered substrate which is having the nickel hydroxide thus filled into an aqueous solution of tungsten salt so that the sintered substrate is impregnated with the tungsten salt, and finally immersing the sintered substrate thus impregnated with the tungsten salt into an alkaline aqueous solution so that the tungsten salt deposits as the tungstic acid on the surface of the nickel hydroxide.

As the above-mentioned tungsten salt, tungsten hexachloride $WCl_6$, tungsten pentachloride $WCl_5$, tungsten pentabromide $WBr_5$, and the like can be used.

In forming the sintered nickel electrode for alkaline storage battery, the amount of the tungstic acid to be adhered to the surface of the nickel hydroxide is adjusted by changing number of times of the above-mentioned operation of impregnating the sintered substrate which is thus having the nickel hydroxide filled into the tungsten salt to deposit the tungsten salt thus impregnated on the surface of the nickel hydroxide as the tungstic acid, or by changing the time for which the sintered substrate having the nickel hydroxide filled is immersed in the above-mentioned aqueous solution of the tungsten salt.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
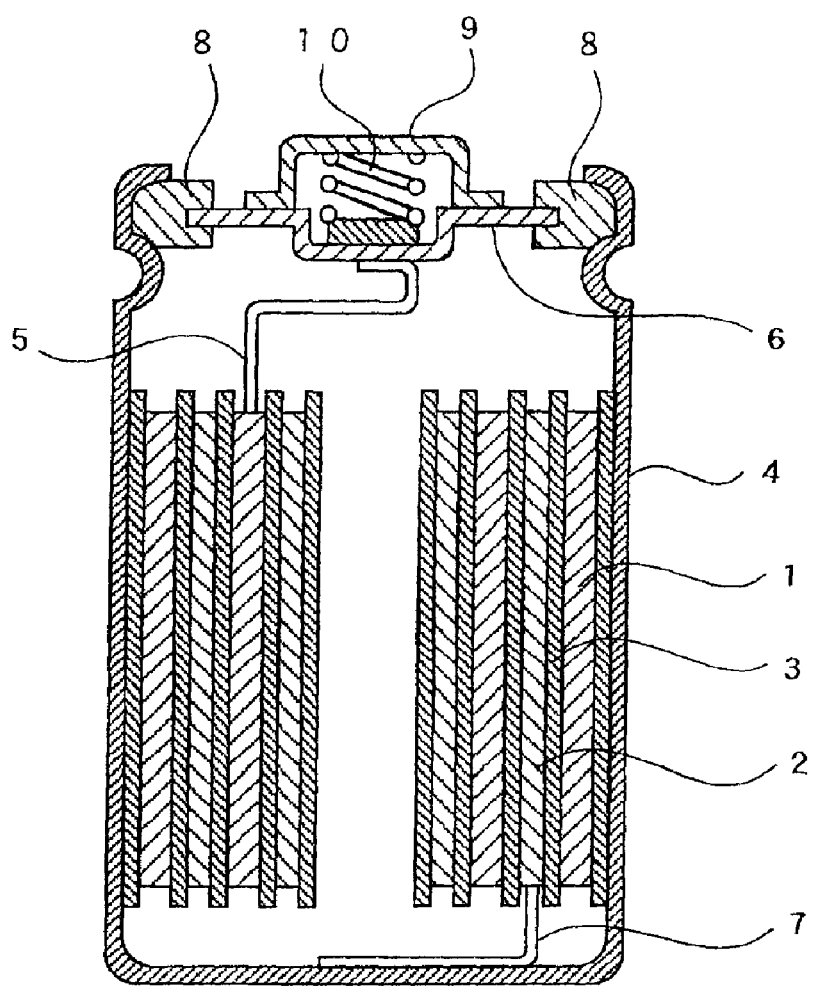
FIG. 1 is a schematic sectional view showing the internal structure of each of alkaline storage batteries fabricated in examples and comparative examples of the invention.

The following examples specifically illustrate a sintered nickel electrode for an alkaline storage battery, method of forming the same, and an alkaline storage battery using as its positive electrode the nickel electrode for alkaline storage battery. Further, comparative examples will be taken to make it clear that in each of the alkaline storage batteries according to the examples, charge characteristic under high temperature conditions is improved. It should be appreciated that the sintered nickel electrode for alkaline storage battery, method of forming the same, and the alkaline storage battery according to the present invention are not particularly limited to those in the following examples, and various changes and modifications may be made in the invention without departing from the spirit and scope thereof.

EXAMPLE 1

In the example 1, a sintered nickel electrode for alkaline storage battery was formed in the following manner.

Nickel powder and carboxymethyl cellulose as a binding agent were mixed to prepare a slurry. The slurry thus prepared was applied to a punching metal having thickness of 50 μm, was dried, was burned for 20 minutes at a temperature of 900° C. in a hydrogen atmosphere to form a sintered substrate having a porosity of about 85%, an average pore diameter of 10 μm, and thickness of 0.65 mm.

The above-mentioned sintered substrate was immersed in a nickel nitrate $Ni(NO_3)_2$ aqueous solution in a specific gravity of 1.5 so that the nickel nitrate is adhered to pore of the sintered substrate. The sintered substrate was then immersed in 25 wt % of a sodium hydroxide aqueous solution to transform the nickel nitrate in the pore of the sintered substrate into the nickel hydroxide. The operation was repeated for six times to fill the nickel hydroxide into the pore of the sintered substrate.

The sintered substrate thus having the nickel hydroxide filled into the pore was immersed in a tungsten hexachloride aqueous solution in a concentration of 0.1 mol/l for 30 minutes, was then dried at a temperature of 60° C. for 30 minutes.

The sintered substrate was immersed in 30 wt % of the sodium hydroxide aqueous solution for 30 minutes, and was dried at a temperature of 60° C. for 30 minutes to form the sintered nickel electrode for alkaline storage battery in which the tungstic acid was adhered to the surface of the nickel hydroxide.

In the sintered nickel electrode for alkaline storage battery thus formed, the weight ratio of tungsten element in the tungstic acid based on the nickel hydroxide found by ICP (Inductivity Coupled Plasma Emission Spectrometry) was 0.2 wt %.

The sintered nickel electrode for alkaline storage battery thus formed was used as the positive electrode while a paste type cadmium electrode which has been conventionally used as a negative electrode was used as the negative electrode. Polyamid non-woven fabric was used as a separator, and 30 wt % of a potassium hydroxide aqueous solution was used as an alkaline electrolyte solution. Thus an alkaline storage battery of AA size of the example A1 as shown in FIG. 1 was fabricated.

In the alkaline storage battery, a separator 3 was interposed between a positive electrode 1 and a negative electrode 2, was wound up in a spiral shape, and was contained in a battery can 4. Thereafter, the alkaline electrolyte solution was poured into the battery can 4, to seal the battery can 4. The positive electrode 1 was connected to a positive electrode cover 6 through a positive electrode lead 5, and the negative electrode 2 was connected to the battery can 4 through a negative electrode lead 7. The battery can 4 and the positive electrode cover 6 were electrically separated by an insulating packing 8.

A coil spring 10 was provided between the positive electrode cover 6 and a positive electrode external terminal 9. When the internal pressure of the battery was abnormally raised, the coil spring 10 was compressed so that gas inside the battery was released into the air.

COMPARATIVE EXAMPLE 1

In the comparative example 1, in forming the sintered nickel electrode for alkaline storage battery of the example 1, the sintered substrate having the nickel hydroxide filled into the pore was used as the sintered nickel electrode for alkaline storage battery, thus, the tungstic acid was not adhered to the surface of the nickel hydroxide.

Except that the sintered nickel electrode for alkaline storage battery thus formed was used as the positive electrode, the same procedure as that in the example 1 was taken to fabricate an alkaline storage battery of the comparative example 1.

Subsequently, each of the alkaline storage batteries of the example 1 and the comparative example 1 was respectively charged at a charging current of 100 mA for 16 hours under a temperature condition of 25° C., then was discharged to 1.0 V at a discharging current of 1000 mA. The charge/discharge was regarded as one cycle. Five cycles of the charge/discharge were performed to find a discharge capacity C5 at the fifth cycle of each of the alkaline storage batteries of the example 1 and comparative example 1.

The discharge capacity C5 at the fifth cycle of the alkaline storage battery of the example 1 was set to 100, to find a relative index of the discharge capacity, which was regarded as a capacity index, of the alkaline storage battery of the comparative example 1. The results were shown in the following Table 1.

Further, each of the above-mentioned alkaline storage batteries to which five cycles of the charge/discharge were carried out was further charged at the charging current of 100 mA for 16 hours under a high temperature condition of 60°C., then was discharged to 1.0 V at the discharging current of 1000 mA under the temperature condition of 25° C. to find the discharge capacity C6 at the sixth cycle.

A ratio R (%) of the discharge capacity C6 at the sixth cycle based on the discharge capacity C5 at the fifth cycle of each of the alkaline storage batteries of the example 1 and the comparative example 1 was calculated by a formula R=(C6/C5)×100. The results were shown in the following Table 1.

TABLE 1

|  | ratio of W element base on nickel hydroxide (wt %) | capacity index | R (%) |
| --- | --- | --- | --- |
| example 1 | 0.2 | 100 | 87 |
| comparative example 1 | — | 98 | 70 |

As apparent from the results, the alkaline storage battery of the example 1 using the sintered nickel electrode for alkaline storage battery in which the tungstic acid was adhered to the surface of the nickel hydroxide as the active material presented a larger value of the above-mentioned ratio R and smaller decline in the discharge capacity in the case in which the battery was charged under high temperature conditions, thereby improving in the charge characteristic under high temperature conditions compared with the alkaline storage battery of the comparative example 1 using the sintered nickel electrode for alkaline storage battery in which the tungstic acid was not adhered to the surface of the nickel hydroxide.

EXAMPLES A1 TO A6

In the examples A1 to A6, in forming the sintered nickel electrode for an alkaline storage battery, the nickel hydroxide was filled into the pore of the sintered substrate.

In adhering the tungstic acid to the surface of the nickel hydroxide which was filled into the pore of the sintered substrate, the conditions were changed. In the examples A1 and A2, the time for which the sintered substrate having the nickel hydroxide filled into the pore was immersed in the tungsten hexachloride aqueous solution in the concentration of 0.1 mol/1 was respectively changed to 5 minutes in the example A1 and 10 minutes in the example A2. Except for the above, the same procedure as that in the example 1 was taken to form each of the sintered nickel electrodes for alkaline storage batteries in which the tungstic acid was adhered to the surface of the nickel hydroxide.

In the examples A3 to A6, the number of times of the operation for adhering the tungstic acid to the surface of the nickel hydroxide filled into the pore of the sintered substrate was respectively changed to 3 times in the example A3, 5 times in the example A4, 8 times in the example A5, and 10 times in the example A6 to form each of the sintered nickel electrodes for alkaline storage batteries in which the tungstic acid was adhered to the surface of the nickel hydroxide.

In each of the nickel electrodes for alkaline storage batteries thus formed, the weight ratio of the tungsten element in the tungstic acid based on the nickel hydroxide was respectively 0.01 wt % in the example A1, 0.05 wt % in the example A2, 0.6 wt % in the example A3, 1 wt % in the example A4, 3 wt % in the example A5, and 4 wt % in the example A6 as shown in the following Table 2.

Except that each of the nickel electrodes for alkaline storage batteries thus formed was used, the same procedure as that in the example 1 was taken to fabricate each of the alkaline storage batteries of the examples A1 to A6.

Subsequently, the charge/discharge was performed repeatedly to each of the alkaline storage batteries of the examples A1 to A6 thus fabricated under the temperature condition of 25° C., and the discharge capacity C5 at the fifth cycle was found. Further, each of the above-mentioned alkaline storage batteries was further charged at the charging current of 100 mA for 16 hours under the high temperature condition of 60° C., then was discharged to 1.0 V at the discharging current of 1000 mA under a temperature condition of 25° C. to find the discharge capacity C6 at the sixth cycle in the same manner as the above-mentioned example 1.

The discharge capacity C5 at the fifth cycle of the alkaline storage battery of the example 1 was set to 100, to find a capacity index of each of the alkaline storage batteries of the example A1 to A6. In addition, the ratio R of the discharge capacity C6 at the sixth cycle based on the discharge capacity C5 at the fifth cycle of each of the alkaline storage batteries was calculated by a formula R=(Q6/Q5)×100. The results were shown in the following Table 2.

TABLE 2

|  | ratio of W element base on nickel hydroxide (wt %) | capacity index | R (%) |
| --- | --- | --- | --- |
| example A1 | 0.01 | 98 | 71 |
| example A2 | 0.05 | 100 | 85 |
| example 1 | 0.2 | 100 | 87 |
| example A3 | 0.6 | 100 | 85 |
| example A4 | 1 | 99 | 84 |
| example A5 | 3 | 98 | 83 |
| example A6 | 4 | 92 | 73 |

As apparent from the results, each of the alkaline storage batteries of the examples 1 and A2 to A5 using the sintered nickel electrodes for alkaline storage batteries in which the ratio of the tungsten element in the tungstic acid based on the nickel hydroxide was in the rage of 0.05 to 3 wt % presented a larger value of the ratio R and smaller decline in the discharge capacity in a case in which the batteries were charged under high temperature conditions, thereby improving in the charge characteristics under high temperature conditions compared with the alkaline storage battery of the example A1 using the sintered nickel electrode for alkaline storage battery in which the ratio of the tungsten element based on the nickel hydroxide was 0.01 wt %, and the alkaline storage battery of the example A6 using the sintered nickel electrode for alkaline storage battery in which the ratio of the tungsten element based on the nickel hydroxide was 4 wt %.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

What is claimed is:

1. A method of forming a sintered nickel electrode for alkaline storage battery comprising steps of:

filling nickel hydroxide as an active material into a porous sintered substrate, immersing said sintered substrate having nickel hydroxide filled into an aqueous solution of tungsten salt to impregnate the tungsten salt therein, and immersing said sintered substrate having the tungsten salt impregnated into an alkaline aqueous solution to deposit said tungsten salt on a surface of the nickel hydroxide as tungstic acid.

2. The method of forming a sintered nickel electrode for alkaline storage battery according to claim 1, wherein said tungsten salt is at least one type selected from a group consisting of tungsten hexachloride, tungsten pentachloride, and tungsten pentabromide.

3. A sintered nickel electrode for alkaline storage battery comprising:

a porous sintered substrate;

an active material of nickel hydroxide filled in the porous sintered substrate; and a tungstic acid adhered to a surface of the filled nickel hydroxide, wherein the tungstic acid is $WO_3 \cdot nH_2O$, wherein the sintered nickel electrode is prepared by steps comprising:

filling nickel hydroxide into the porous sintered substrate;

immersing the sintered substrate having nickel hydroxide filled into an aqueous solution of tungsten salt to impregnate the tungsten salt therein; and immersing the sintered substrate having the tungsten salt impregnated into an alkaline aqueous solution to deposit the tungsten salt on a surface of the nickel hydroxide as the tungstic acid, wherein a weight ratio of a tungsten element in the tungstic acid based on the nickel hydroxide is in a range of 0.05 to 3 wt %.

* * * * *